United States Patent [19]

Seko et al.

[11] 4,151,053

[45] Apr. 24, 1979

[54] CATION EXCHANGE MEMBRANE PREPARATION AND USE THEREOF

[75] Inventors: Naomi Seko; Yasumichi Yamakoshi, both of Tokyo; Hirotsugu Miyauchi, Kanagawa; Mitsunobu Fukumoto, Kanagawa; Kyoji Kimoto, Kanagawa; Itaru Watanabe, Kanagawa; Toshioki Hane, Kanagawa; Sakae Tsushima, Kanagawa, all of Japan

[73] Assignee: Asahi Kasei Kogyo Kabushiki Kaisha, Osaka, Japan

[21] Appl. No.: 887,761

[22] Filed: Mar. 17, 1978

Related U.S. Application Data

[63] Continuation of Ser. No. 701,515, Jul. 1, 1976, abandoned.

[30] Foreign Application Priority Data

Jul. 9, 1975 [JP] Japan .................................. 50-84111
Jul. 9, 1975 [JP] Japan .................................. 50-84112
Mar. 31, 1976 [JP] Japan .................................. 51-35593

[51] Int. Cl.$^2$ .................. C25B 1/16; C25B 1/26; C25B 13/08
[52] U.S. Cl. ..................... 204/98; 204/128; 204/252; 204/296; 521/29
[58] Field of Search ............ 204/98, 296, 252, 128; 260/2.1 E, 2.2 R, 79.3 M; 526/247

[56] References Cited

U.S. PATENT DOCUMENTS

| | | | |
|---|---|---|---|
| 3,301,893 | 1/1967 | Putnam et al. | 260/2.2 R |
| 3,674,587 | 7/1972 | Carlson et al. | 526/247 |
| 3,784,399 | 1/1974 | Grot | 260/73.9 M |
| 3,887,499 | 6/1975 | Hodgdon | 260/2.2 R |
| 3,969,285 | 7/1976 | Grot | 260/73.9 M |
| 4,065,366 | 12/1977 | Oda et al. | 204/98 |

*Primary Examiner*—Leland A. Sebastian
*Attorney, Agent, or Firm*—Birch, Stewart, Kolasch & Birch

[57] ABSTRACT

Cation exchange membrane comprising a fluorocarbon polymer characterized by the presence of pendant carboxylic acid groups of the formula — $OCF_2COOH$ — and derivatives thereof.

34 Claims, No Drawings

CATION EXCHANGE MEMBRANE PREPARATION AND USE THEREOF

This is a division, of application Ser. No. 701,515 filed July 1, 1976, now abandoned.

BACKGROUND OF INVENTION

This invention relates to improved cation exchange membranes and to methods for their production. The invention is further directed to methods for the electrolysis of an aqueous solution of an alkali metal halide by use of these cation exchange membranes, and to the electrolytic cells in which the electrolysis takes place.

It has been known to the art to obtain a cation exchange membrane of a perfluorocarbon polymer containing pendant sulfonic acid groups by saponification of a membrane prepared from a copolymer of tetrafluoroethylene and perfluoro-3,6-dioxa-4-methyl-7-octene-sulfonyl fluoride. This known perfluorocarbon type cation exchange membrane containing only sulfonic acid groups, however, has the disadvantage that the membrane, when used in the electrolysis of an aqueous solution of an alkali metal halide, tends to permit penetration therethrough of hydroxyl ions back migrating from the cathode compartment because of the high hydrophilicity of the sulfonic acid group. As a result, the current efficiency during electrolysis is low. This is a special problem when the electrolysis is used for the production of aqueous solutions of caustic soda at concentrations of more than 20 percent. In this reaction, the current efficiency is so low that the process is economically disadvantageous compared with electrolysis of aqueous solutions of sodium chloride by the conventional mercury process or diaphragm process.

The disadvantage of such low current efficiency can be alleviated by lowering the exchange capacity of the sulfonic acid group to less than 0.7 milliequivalent per gram of the H form dry resin. Such lowering, however, results in a serious decrease in the electroconductivity of the membrane and a proportional increase in the power consumption. This solution, therefore, is not without its economic difficulties.

U.S. Pat. No. 3,909,378 discloses composite cation exchange membranes containing sulfonic acid moieties as the ion exchange group and comprising two polymers with different equivalent weight (EW), that is number of grams of polymer containing one equivalent weight of ion exchange functional group. When such membranes are utilized in the electrolysis of aqueous solutions of sodium chloride, high current efficiencies are obtained by effecting the electrolysis with the higher EW polymer side of the composite membrane facing the cathode. For high current efficiency coupled with low power consumption, the value of EW of the higher EW polymer must be increased and the thickness decreased as much as possible. It is, however, extremely difficult to produce a composite cation exchange membrane having a current efficiency of not less than 90 percent by use of membranes containing only sulfonic acid groups.

In U.S. Pat. No. 3,784,399, German Pat. OLS No. 2,437,395 (U.S. Patent Application Ser. No. 406,361 filed Oct. 15, 1973) and German Patent OLS No. 2,447,540 (U.S. Patent Application Ser. No. 425,079 filed Dec. 17, 1973), there are suggested cation exchange membranes wherein the cathode side surface layers of fluorocarbon cation exchange membranes contain sulfonamide groups, salts thereof or N-monosubstituted sulfonamide groups. These membranes, however, are deficient in electrochemical and chemical stabilities.

An object of this invention is to provide fluorocarbon cation exchange membranes which, even in electrolysis for production of caustic soda at high concentration, more effectively inhibit the back migration of hydroxyl ions and enable the electrolysis to proceed constantly with higher current efficiency than the conventional fluorocarbon cation exchange membranes and to provide a method for the manufacture of said membranes.

Another object of this invention is to provide a method for the electrolysis of the aqueous solution of an alkali metal halide by use of such cation exchange membranes.

THE INVENTION

Novel cationic membranes characterized by the presence of pendant carboxylic acid or salt groups have now been discovered. These membranes when used in electrolysis cells, particularly when used in such cells for the electrolysis of sodium chloride to produce aqueous sodium hydroxide, have many advantages compared to conventional cation exchange membranes. A particular advantage is the durability of the membranes, it having been found that the current efficiency of the membranes remains stable at well above 90%, even after many months of operation.

The present invention provides a cation exchange membrane comprising a fluorocarbon polymer containing pendant carboxylic acid or salt groups (referred to hereinafter as carboxylic acid groups or substituents) represented by the formula:

$$-OCF_2COOM$$

wherein M is hydrogen; ammonium; quaternary ammonium, particularly quaternary ammonium having a molecular weight of 500 or less; and metallic atoms, particularly alkali or alkaline earth metals.

In its simplest form, a cation exchange membrane of this invention is a film forming perfluorocarbon polymer. The thickness of the film can be varied widely depending on its purpose. There is no particular limit to the thickness, but usually a thickness from 0.5 to 20 mils is suitable for many purposes.

The preferred embodiments of membranes are characterized by the presence of at least one stratum on the surface or in the internal portion of at least about 100 Å in thickness in which the polymer is substituted with pendant carboxylic acid or salt groups represented by the formula as set forth above.

The membrane of this invention can be classified into two major groups. One is a uni-layer film wherein the equivalent weight (EW) of the cation exchange groups is uniform throughout the membrane. The other is a two-ply film in which a first film having a higher EW value and a second film having a lower EW value are combined. In each case, the specific fluorocarbon polymer as defined above can be present either homogeneously throughout the film or as a stratum on one surface or in the internal portion of the membrane. The membrane, however, can sometimes have strata both on the opposed surfaces of the membrane in each of the aforesaid groups. As mentioned above, according to the preferred embodiment of the two-ply layer, the first film having a higher EW value is provided with the specific fluorocarbon polymer, preferably as a surface stratum of at least 100 Å in thickness on the surface opposite to the side laminated with the second film. For practical purposes, the membrane is usually reinforced with reinforcing materials selected from the group consisting of woven fabrics of inert fibers and porous films of inert polymers, preferably polytetrafluoroethylene fibers. The reinforcing material is desirably embedded in the membrane at the side opposite to the side having the stratum of the specific fluorocarbon polymer of the invention. In the two-ply layer, the reinforcing material is desirably embedded in the second film having the lower EW value.

For convenience, a detailed explanation is given in the following principally with reference to the uni-layer film having a surface stratum on the membrane. The structure of the first film in the two-ply layer membrane with regard to functional groups is substantially the same as the uni-layer film. When the membrane is used in electrolysis, the side having the stratum is placed in the electrolytic cell to face the cathode side in order to obtain the remarkable effect of the invention.

The stratum may also contain sulfonic acid or salt groups (referred to hereinafter as sulfonic acid groups or substituents) which may be represented by the formula:

—OCF$_2$CF$_2$SO$_3$M wherein M has the same meaning as above.

In fact, since the cationic membranes of this invention are derived from sulfonic acid group substituted fluorocarbon copolymers, they may contain any predetermined proportion of sulfonic acid groups, or derivatives thereof.

The specific fluorocarbon polymer constituting the stratum of this invention may contain from 5 to 100 mol percent of carboxylic acid substitutents based on total cation exchange groups. Usually, as the distance from the surface increases the relative percent of carboxylic acid substituents decreases, and the relative percent of sulfonic acid substituents increases. In preferred embodiments of the invention, only one surface is predominantly carboxylic acid substituents, and the quantity of sulfonic acid groups will increase with distance from that surface until the opposite surface is predominantly sulfonic acid groups. According to one preferred embodiment, there is a cation exchange membrane comprising (a) a fluorocarbon polymer containing pendant carboxylic acid or salt groups of the formula —OCF$_2$COOM and (b) a fluorocarbon polymer having cation exchange groups substantially consisting of sulfonic acid or salt groups of the formula —OCF$_2$CF$_2$SO$_3$M. According to the most preferable reinforced layer membrane, there is the surface stratum only on the side opposite to the reinforced side, the remaining portion substantially consisting of a fluorocarbon polymer having as cation exchange groups sulfonic acid or salt groups of the formula —OCF$_2$CF$_2$SO$_3$M. It is also possible by special procedures to prepare embodiments of this invention in which carboxylic acid or salt groups are uniformly distributed throughout the membrane.

It has been observed that the presence of carboxylic acid groups on the surface of the cation exchange membrane, particularly on the surface facing the cathode, remarkably impedes the back migration of hydroxyl ions from the cathode compartment during the electrolysis of aqueous solutions of alkali metal halides such as sodium chloride. These effects are realized while operating at high current efficiencies, normally well over 90%. Moreover, the membranes of the invention are especially durable even in the presence of aqueous solutions of sodium hydroxide at a concentration of 20%, or even higher, and also highly resistant to chlorine gas generated from the anode.

As indicated above, the surface density of carboxylic acid groups may vary from 5 to 100 mol percent. The preferred range is from 20 to 100 mol percent, and the best combinations of economy and efficiency are normally realized if the density is from 40 to 100 mol percent; all based on the total number of all functional groups in the surface strata.

The depth of the surface strata can be ascertained by staining techniques. For example, a section of a prepared membrane can be immersed for several minutes in an aqueous solution of crystal violet containing 5 to 10% ethanol as a solubility aid. This dye will stain only the treated sections, and a cross section of the membrane can be examined microscopically.

Alternatively, the thickness of the layer and the density of the carboxylic acid groups can be determined by x-ray microprobe analysis.

The membranes of this invention may take any of several forms, as is particularly illustrated in the examples. As mentioned above, it may be a simple unilayer film with one or both major surfaces embodying strata with carboxylic acid substituents. Alternatively, the membranes may be composite membranes formed from two appropriately prepared and substituted perfluorocarbon films bonded together in each of which the EW is from about 1000 to 2000, preferably 1000 to 1500.

If a two film membrane is employed, the first film should have an EW which is at least 150 higher than the second film, and its thickness should be up to one half of the total thickness. In fact, the thin film should be as thin as possible to minimize total electrical resistance. Due to the difficult manufacturing techniques involved, the thin film will generally occupy from about 10 to 45% of the total thickness.

In other forms of the invention, the membranes may be laminated to reinforcing materials to improve mechanical strength. For this purpose fabrics made of polytetrafluoroethylene fibers are most suitable, although other materials which are inert to the chemical environment in which the membranes are employed may also be used. Particularly, polytetrafluoroethylene films may preferably be employed as reinforcing materials. If reinforcing materials are utilized, it is particularly advantageous to embed them in the polymer membrane. This can be readily accomplished, for example, at elevated temperature and under reduced pressure as illustrated in the examples.

In all of these various constructions, the most preferred membranes will be constructed with carboxylic groups predominating on one surface, and sulfonic groups predominating on the other. In composite membranes the film with the higher EW will preferably carry the carboxyl groups.

The starting fluorocarbon polymer having the sulfonic acid groups as the side chain thereof is produced by copolymerizing a fluorinated ethylene and a vinyl fluorocarbon monomer having a sulfonyl fluoride group of the generic formula (I) given below:

FSO$_2$CF$_2$CF$_2$O(CFYCF$_2$O)$_n$CF=CF$_2$  (I)

(wherein, Y represents F or a fluoroalkyl group having 1 to 5 carbon atoms and n an integer having the value of 0–3), if necessary, in conjunction with a monomer selected from the class consisting of hexafluoropropylene, $CF_3CF=CF_2$ and compounds of the generic formula (II) given below:

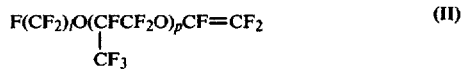

(wherein, l represents an integer having the value of 1–3 and p an integer having the value of 0–2), thereby deriving a polymer possessing a side chain of $-OCF_2CF_2SO_2F$, shaping the resultant polymer in the form of a membrane and thereafter converting the side chain $-OCF_2CF_2SO_2F$ of said polymer into the group $-OCF_2CF_2SO_3M$ through saponification.

Typical examples of fluorinated ethylene include vinylidene fluoride, tetrafluoroethylene and chlorotrifluoroethylene. Among them, tetrafluoroethylene is most preferred.

Typical examples of the vinyl fluorocarbon monomer having the sulfonyl fluoride group of the aforementioned generic formula include those enumerated below:

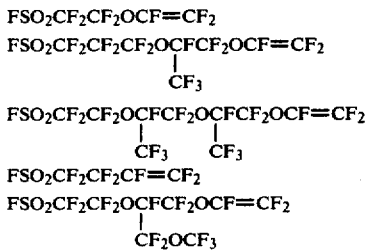

Of the vinyl fluorocarbon monomers having the sulfonyl fluoride group available at all, the most desirable is perfluoro(3,6-dioxa-4-methyl-7-octene sulfonyl fluoride),

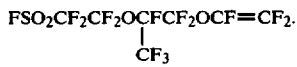

A typical example of the fluorovinyl ether of the generic formula (II) which takes part, where necessary, in said copolymerization is perfluoromethyl vinyl ether.

The process of the invention is applicable to all of the sulfonyl substituted polymers described in U.S. Pat. No. 3,909,378.

Advantageously, the membrane is first formed with the sulfonyl substituted polymer which is then converted by reactions described more fully hereinafter to a membrane of the invention.

The preferred copolymer composition for starting materials is such that the fluorinated ethylene monomer content is from 30 to 90 percent by weight, preferably from 40 to 75 percent by weight, and the content of the perfluorovinyl monomer possessing the sulfonyl fluoride group is from 70 to 10 percent by weight, preferably from 60 to 25 percent by weight. The materials are produced by procedures well known in the art for the homopolymerization or copolymerization of a fluorinated ethylene.

Polymerization may be effected in either aqueous or nonaqueous systems. Generally, the polymerization is performed at temperatures of from 0° to 200° C. under a pressure of from 1 to 200 kg/cm². Frequently, the polymerization in the nonaqueous system is carried out in a fluorinated solvent. Examples of such nonaqueous solvents include 1,1,2-trichloro-1,2,2-trifluoroethane and perfluorocarbons such as perfluoromethylcyclobutane, perfluorooctane and perfluorobenzene.

The aqueous system polymerization is accomplished by bringing the monomers into contact with an aqueous solvent containing a free radical initiator and a dispersant to produce a slurry of polymer particles, or by other well known procedures.

After the polymerization, the resultant polymer is shaped to form a membrane using any of a variety of well known techniques.

The copolymer is desired to have an EW in the range of from 1000 to 2000. The membrane having a low EW is desirable in the sense that the electric resistance is proportionally low. A membrane of a copolymer having a notably low EW is not desirable since the mechanical strength is not sufficient. A copolymer having a notably high EW cannot easily be shaped in the form of a membrane. Thus, the most desirable range of EW is from 1000 to 1500.

The copolymer, after being shaped into a membrane, can be laminated with a reinforcing material such as fabrics for improvement of mechanical strength. As the reinforcing material, fabrics made of polytetrafluoroethylene fibers are most suitable. The aforesaid stratum should preferably be allowed to be present on the surface opposite to the side on which the reinforcing material is lined.

In case of the cation exchange membrane having two bonded films which is the preferred embodiment of the invention as mentioned above, two kinds of copolymers having different EW are prepared according to the polymerization methods as described above, followed by shaping, and fabricated into a composite film. The first film is required to have an EW of at least 150 greater than the EW of the second film and also to have a thickness of not more than one half of the entire thickness. The thickness of the first film is preferably as thin as possible, since electric resistance is greatly increased with an increase in EW. Thus, the thickness of the first film which depends on the EW thereof is required to be 50% or less of the entire thickness, preferably from 45 to 10%.

It is important that the first film of a higher EW is present in the form of a continuous film formed parallel to the surface of the membrane.

The overall thickness of said composite cation exchange membrane, though variable with the kind of particular ion exchange group used, the strength required of the copolymer as the ion exchange membrane, the type of electrolytic cell and the conditions of operation, generally has a lower limit of 4 mils and no upper limit. The upper limit is usually fixed in consideration of economy and other practical purposes.

Said composite membrane may be laminated with fabrics or some other suitable reinforcing material with a view to improvement of the mechanical strength thereof. The reinforcing material is preferably embedded in the second film. As the reinforcing material, fabrics made of polytetrafluoroethylene filaments are most suitable.

For the preparation of the products of this invention, the pendant sulfonyl groups in the form represented by the formulas:

—OCF$_2$CF$_2$SO$_2$X (A)
and/or
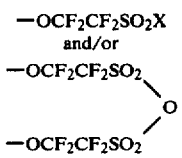
(B)

wherein X is halogen, especially fluorine or chlorine; hydroxyl; alkyl containing up to four carbon atoms; aryl or OZ where Z is a metallic atom, especially an atom of an alkali metal, alkyl containing up to four carbon atoms or aryl; are converted to:

—OCF$_2$COOM by treatment with a reducing agent.

Since the conversion to a carboxylic acid group is effected chemically, it can be controlled so as to produce products with substantially any degree of carboxylation which may be desired.

The starting polymers are usually formed from sulfonyl fluoride substituted compounds which remain intact during polymerization. The sulfonyl fluoride groups can directly be treated with a reducing agent to be converted to the carboxylic acid groups. Alternatively, they may be first converted to any of the other derivatives of sulfonic acid as defined in the above formulas (A) and (B) by known reactions, followed by conversion into the carboxylic acid groups. The sulfonyl chloride groups are especially preferred due to higher reactivity. Therefore, it is more desirable to convert the sulfonyl fluoride to any of the other derivatives of sulfonic acid defined above in connection with the definition of X. Such reactions can be readily carried out by procedures well known to the art.

The formation of the carboxylic group may follow any of several pathways.

It may be formed by reduction to a sulfinic acid with a relatively weak reducing agent followed by a heat treatment as indicated below:

Conversion into carboxylic acid groups can more readily be effected when M in the above formulas is hydrogen. Alternatively the treatment may be stepwise in which initially a sulfinic acid is produced, and this is converted to a carboxylic group by the use of a strong reducing agent. This may take place as indicated below:

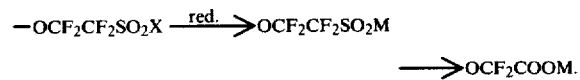

With some reducing agents, the treatment may be directly from the sulfonic group to the carboxyl group, as indicated by,

OCF$_2$CF$_2$SO$_3$M→OCF$_2$COOM

It is preferred that the concentration of sulfinic acid groups in the final product be relatively low. Accordingly, it may be desirable, but not necessary, to oxidize sulfinic acid groups to sulfonic acid groups by the following sequence:

—OCF$_2$CF$_2$SO$_2$M→OCF$_2$CF$_2$SO$_3$M

This may be accomplished by known procedures utilizing aqueous mixtures of sodium hydroxide and hypochlorite.

The reducing agents which can be used in the present invention are exemplified as shown below. Those skilled in the art are completely familiar with these reducing agents and many other similar reducing agents as well as procedures by which they are employed. However, some of the reducing agents such as hydrazine having amino groups which are capable of forming sulfonamide groups as disclosed in German Patent OLS No. 2,437,395 (U.S. patent application Ser. No. 406,361 filed Oct. 15, 1973) are not suitable for the purpose of the invention, and therefore they are excluded from the scope of the invention.

The reducing agents of the first group are metal hydrides of the generic formula MeLH$_4$, wherein Me represents an alkali metal atom and L an aluminum or boron atom, or Me'H$_x$, wherein Me' represents an alkali metal atom or alkaline earth metal atom and x is an integer with a value of 1 to 2. These include, for example, lithium aluminum hydride, lithium boron hydride, potassium boron hydride, sodium boron hydride, sodium hydride and calcium hydride.

The reducing agents of the second group are inorganic acids possessing reducing activity such as, for example, hydroiodic acid, hydrobromic acid, hypophosphorous acid, hydrogen sulfide and arsenious acid.

The reducing agents of the third group are mixtures of metals and acids. Examples of these mixtures include tin, iron, zinc and zinc amalgam and those of acids include hydrochloric acid, sulfuric acid and acetic acid.

The reducing agents of the fourth group are compounds of low-valency metals. Examples of these compounds include stannous chloride, ferrous sulfate and titanium trichloride. They may be used in conjunction with such acids as hydrochloric acid and sulfuric acid.

The reducing agents of the fifth group are organic metal compounds. Examples of these reducing agents include butyl lithium, Grignard reagent, triethyl aluminum and triisobutyl aluminum.

The reducing agents of the sixth group are inorganic acid salts possessing reducing activity and similar compounds. Examples of these reducing agents include potassium iodide, sodium iodide, potassium sulfide, sodium sulfide, ammonium sulfide, sodium sulfite, sodium dithionite, sodium phosphite, sodium arsenite, sodium polysulfide and phosphorus trisulfide.

The reducing agents of the seventh group are mixtures of metals with water, steam, alcohols or alkalis. Examples of metals usable in the mixtures include sodium, lithium, aluminum, magnesium, zinc, iron and amalgams thereof. Examples of alkalis include alkali hydroxides and alcoholic alkalis.

The reducing agents of the eighth groups are organic compounds possessing a reducing activity such as, for example, triethanol amine and acetaldehyde.

Among the groups as enumerated above, those belonging to the second, third, fourth and sixth groups are found to be preferable.

The optimum conditions for treatment with a reducing agent will be selected depending on the selected reducing agent to be used and on the kind of the substituent X in the SO$_2$X group. Generally, the reaction temperature is in the range of from $-50°$ C. to 250° C., preferably from 0° C. to 150° C., and the reducing agent is used in the form of a gas, liquid or solution. As the solvent for the reaction, there can be used water; polar organic solvents such as methanol, tetrahydrofuran, diglyme, acetonitrile, propionitrile or benzonitrile; or nonpolar organic solvents such as n-hexane, benzene or cyclohexane or mixtures of such solvents.

The amount of the reducing agent is not less than the equivalent weight of the sulfonyl group present in the surface. Generally, the reducing agent will be used in large excess. The pH value of the reaction system will be selected on the basis of the particular reducing agent employed.

The reaction can be carried out under reduced, normal or increased pressure. In the reaction involving the use of a gaseous reducing agent, the increased pressure can improve the velocity of the reaction.

The reaction time generally ranges from one minute to 100 hours.

In case of a cation exchange membrane reinforced with a reinforcing material, treatment with a reducing agent is preferably applied onto the side opposite to the reinforced side.

The course of the reaction may be followed by analysis of the infrared absorption spectrum of the membrane, as is particularly illustrated in the examples. Key bands in following the reaction are as follows:

sulfonyl chloride—1420 cm$^{-1}$
sulfinic acid salt—940 cm$^{-1}$
sulfinic acid salt—1010 cm$^{-1}$
carboxylic acid—1780 cm$^{-1}$
carboxylic acid salt—1690 cm$^{-1}$ The specific functional groups of the invention are found to be unitary species having a neutralization point at approximately pKa=2.5 from measurement of electric resistance and infrared spectrum by varying pH. Said functional groups exhibit characteristic absorptions at 1780 cm$^{-1}$ (H form) and at 1690 cm$^{-1}$ (Na form). Furthermore, when converted into chlorides by treatment with PCl$_5$/POCl$_3$, they are found to exhibit characteristic absorption at 1810 cm$^{-1}$. From these measurements, they are identified to be carboxylic acid groups. By elemental analysis by the combustion method, the sulfur atom is found to be decreased by one atom per one exchange group. The fluorine atom is observed to be removed by two atoms per one exchange group by the alizarin-complexion method. From these results of analysis and also from the fact that carboxylic acids are formed by use of a reducing agent containing no carbon atom under an atmosphere free of carbon atoms the above functional groups are confirmed to be —OCF$_2$COOM. This structure is also evidenced by measurement of the NMR spectrum of C$^{13}$ of the product obtained by the reaction, corresponding to the above polymer reaction, conducted for the monomer having the functional group of —OCF$_2$CF$_2$SO$_2$X.

The products of the treatment with a reducing agent may take three typical forms. These are:

(1) All of the —COOM groups required may be formed.
(2) Not all —COOM groups required may be formed and —SO$_2$M groups may be present.
(3) Substantially all —SO$_2$M groups may be present.

In the first instance, no further treatment will be required. In the second and third case, there are two alternatives. A more powerful reducing agent may be employed, or the —SO$_2$M groups may be converted to carboxylic acid groups by heat treatment, which is advantageously carried out when M is hydrogen. The heating may take place at any selected practical pressure at a temperature of from 60° C. to 400° C. for a period of from 15 to 120 minutes. The preferred conditions for efficiency and economy are atmospheric pressure, 100° C. to 200° C., and 30 to 60 minutes.

Any remaining sulfinic acid group may be converted into the sulfonic acid group, if desired. This conversion of the sulfinic acid group to the sulfonic acid group can easily be accomplished such as by subjecting the former group to oxidation in an aqueous solution of 1 to 5 percent NaClO or an aqueous solution of 1 to 30 percent H$_2$O$_2$ at 40° C. to 90° C. for 2 to 20 hours.

The reducing agent to be used for the purpose of this invention is selected, as in ordinary organic reactions, with due consideration to numerous factors such as the kind of the substituent X in the SO$_2$X group, the kind of the reducing agent, the kind of the solvent to be used, the temperature of the reaction, the concentration, the pH value, the reaction time and the reaction pressure.

The reducing agents usable for this invention are broadly divided by their reactions as follows.

The reducing agents of the first group can be applied to virtually all SO$_2$X groups. Occasionally the reaction proceeds to an advanced extent to produce a product which appears to be an alcohol.

The reducing agents of the second, third and fourth groups are particularly effective when applied to sulfonyl halide groups of relatively high reactivity.

The reducing agents of the fifth, sixth, seventh and eighth groups are also effective for application to sulfonyl halide groups, although use of these reducing agents frequently produces the sulfinic acid alone. Use of the —SO$_2$F group demands specially careful selection of the reaction conditions, for it may possibly induce hydrolysis in the presence of a reducing agent from the sixth, seventh and eighth groups.

It is possible to convert the —SO$_2$Cl group directly into the carboxylic acid group without going through the intermediate of sulfinic acid. For example, the conversion can be accomplished by subjecting the membrane of the fluorocarbon polymer possessing the —SO$_2$Cl group to elevated temperature and/or to ultraviolet rays and/or to an organic or inorganic peroxide.

As a matter of course, the reaction of the present invention can be applied to other monomers possessing similar side chains. Thus, fluorocarbon monomers possessing a sulfinic acid group or carboxylic acid group can readily be synthesized by said reaction.

It will be noted that the ultimate effect of the treatment with a reducing agent can be represented by the following reaction:

—OCF$_2$CF$_2$SO$_3$M⟶OCF$_2$COOM.

The membranes of this invention have many advantages, some of which have already been mentioned above.

In the course of the electrolysis of an aqueous solution of an alkali metal halide, the portion of the fluorocarbon polymer possessing the carboxylic acid group in the cation exchange membrane is preferably on the side of the catholyte. Even in the electrolysis performed to produce caustic soda at a high concentration, therefore, the membrane provides effective prevention of the back migration of hydroxyl ions and permits the electrolysis to proceed at high current efficiency.

Particularly when the cation exchange membrane of two-layer construction of this invention is used as the diaphragm in the electrolysis of an aqueous solution of sodium chloride, the prevention of the back migration of hydroxyl ions can be obtained quite effectively and the current efficiency maintained at a high level by allowing the high EW layer resulting from the treatment with the reducing agent to face the cathode side of the electrolytic cell. As a consequence, this cation exchange membrane enables the unit power consumption to be lowered and the prime cost of the product proportionally lowered and, hence, proves to be highly advantageous from the commercial point of view.

Generally, the anode compartment in the electrolysis of an aqueous solution of sodium chloride is operated in an acidic state. In consideration of the fact that the apparent pKa value of the carboxylic acid is on the order of 2 to 3, the presence of the thin layer of the carboxylic acid group on the anode compartment side brings about an effect of heightening the potential and therefore proves disadvantageous.

Compared with the conventional membranes, the membranes of this invention have the following advantages in the process of manufacture. Manufacture of the cation exchange membrane of the fluorocarbon polymer substituted with the carboxylic acid group has heretofore proved to be extremely difficult. This is because the properly substituted fluorocarbon compound monomers are extremely difficult to synthesize. Additionally, copolymers from such monomers with perfluorovinyl monomers are highly susceptible to thermal decomposition and cannot be thermally molded in the form of a membrane by conventional extrusion techniques.

This invention alleviates the aforesaid difficulties by causing the sulfonic acid group of the fluorocarbon polymer to be converted into the carboxylic acid group.

The following examples are given by way of illustration only, and are not to be considered limitations of this invention, many apparent variations of which are possible without departure from the spirit or scope thereof.

EXAMPLE 1

Tetrafluoroethylene and perfluoro(3,6-dioxa-4-methyl-7-octene sulfonyl fluoride) were copolymerized in 1,1,2-trichloro-1,2,2-trifluoroethane in the presence of perfluoropropionyl peroxide as the initiator. The polymerization temperature was held at 45° C. and the pressure maintained at 5 atmospheres during the copolymerization. The exchange capacity of the resultant polymer, when measured after saponification, was 0.95 milligram equivalent/gram of dry resin.

This copolymer was molded with heating into a film 0.3 mm in thickness. It was then saponified in a mixture of 2.5 N caustic soda/50 percent methanol at 60° C. for 16 hours, converted to the H form in 1 N hydrochloric acid, and heated at 120° C. under reflux for 20 hours in a 1:1 mixture of phosphorus pentachloride and phosphorus oxychloride to be converted into the sulfonyl chloride form. At the end of the reaction, the copolymer membrane was washed with carbon tetrachloride and then subjected to measurement of the attenuated total reflection spectrum (hereinafter referred to as A.T.R.), which showed a strong absorption band at 1420 cm$^{-1}$ characteristic of sulfonyl chloride. In a Crystal Violet solution, the membrane was not stained.

Between frames made of acrylic resin, two sheets of this membrane were fastened in position by means of packings made of polytetrafluoroethylene. The frames were immersed in an aqueous 57 percent hydroiodic acid solution so that one surface of each membrane would undergo reaction at 80° C. for 24 hours. The A.T.R. of the membrane was then measured. In the spectrum, the absorption band at 1420 cm$^{-1}$ characteristic of the sulfonyl chloride group vanished and an absorption band at 1780 cm$^{-1}$ characteristic of the carboxylic acid group appeared instead. In the Crystal Violet solution, a layer of a thickness of about 15 microns on one surface of the membrane was stained. The cation exchange groups existing on the surface were found to be carboxylic acid groups (100%) by measurement of A.T.R.

By saponifying this membrane in an aqueous solution of 2.5 N caustic soda/50 percent methanol at 60° C. for 16 hours, there was obtained a homogeneous and strong cation exchange membrane.

In an aqueous 0.1 N caustic soda solution, this membrane showed a specific conductivity of $10.0 \times 10^{-3}$ mho/cm.

The specific conductivity of the membrane was determined by initial conversion to a complete Na form, keeping the membrane in a constantly renewed bath of an aqueous 0.1 N caustic soda solution at about 25° C. for ten hours until equilibrium and subjecting it to an alternating current of 1000 cycles while under an aqueous 0.1 N caustic soda solution at 25° C. for measurement of the electric resistance of the membrane.

The aforementioned Na form electrolytic diaphragm was equilibrated in an aqueous 2.5 N caustic soda solution at 90° C. for 16 hours, incorporated in an electrolytic cell in such a way that the treated surface fell on the cathode side. It was utilized as the membrane in the electrolysis of sodium chloride and its current efficiency measured. The result was 95%.

The electrolytic cell had a service area of 15 cm$^2$ (5 cm × 3 cm) and comprised an anode compartment and a cathode compartment separated by the cationic membrane. A metallic, dimensionally stable DSA anode was used, and an iron plate was used as the cathode. An aqueous 3 N sodium chloride solution at pH 3 was circulated through the anode compartment and an aqueous 35 percent caustic soda solution through the cathode compartment at 90° C. Under these conditions, an electric current was passed between the electrodes at a current density of 50 amperes/dm$^2$. The current efficiency was calculated by dividing the amount of caustic soda produced in the cathode compartment per hour by the theoretical value calculated from the amount of electricity passed.

COMPARISON EXAMPLE 1

The sulfonyl chloride form of the membrane obtained in Example 1 was saponified in a mixture of 2.5 N caustic soda/50 percent methanol. The resultant sulfonic acid form ion exchange membrane was tested for specific conductivity and current efficiency under the conditions as used in Example 1. The values found were $13.0 \times 10^{-3}$ mho/cm and 55% respectively.

EXAMPLE 2

The polymerization of Example 1 was repeated by the same procedure, except that the pressure was maintained at 6 atmospheres during the polymerization. The exchange capacity of the resultant polymer was 0.79 milligram equivalent/gram of dry resin.

The copolymer was molded with heating into a film 0.3 mm in thickness. The membrane was then converted into the sulfonyl chloride form under the same conditions as in Example 1. One surface of the membrane was caused to react with an aqueous 57 percent hydroiodic acid solution at 80° C. for 30 hours.

Thereafter, the treated surface of the membrane was subjected to measurement of A.T.R. In the spectrum, the absorption band at 1420 cm$^{-1}$ characteristic of the sulfonyl chloride group vanished and an absorption band at 1780 cm$^{-1}$ characteristic of the carboxylic acid group appeared instead. In crystal violet solution, a layer having a thickness of about 15 microns on one surface of the membrane was stained. The cation exchange groups on the surface were found to be carboxylic acid groups (100%) by A.T.R.

This membrane was saponified in a solution of 2.0 N caustic soda/50 percent methanol at 60° C. for 40 hours and then treated in an aqueous 2.5 percent sodium hypochlorite at 90° C. for 16 hours. The resultant membrane was treated in a solution of 2.0 N caustic soda/50 percent methanol at 90° C. for 16 hours.

The A.T.R. of this membrane showed the characteristic absorption of a salt of a carboxylic acid group at 1690 cm$^{-1}$ on the surface exposed to the reaction with hydroiodic acid, and an absorption characteristic of a salt of sulfonic acid was observed at 1055 cm$^{-1}$ on the opposite surface.

The specific conductivity of this membrane was $6.5 \times 10^{-3}$ mho/cm. The current efficiency measured under the same conditions as those of Example 1, with the surface treated with hydroiodic acid facing the cathode compartment side, was found to be 94%. After continuous passage of current for 1500 hours, while maintaining the concentration of alkali in the cathode compartment at 30%, the current efficiency was found to be as high as 93.2%.

COMPARISON EXAMPLE 2

The sulfonyl chloride form of the membrane obtained in Example 2 was saponified in a solution of 2.5 N caustic soda/50 percent methanol. The resultant sulfonic acid type ion exchange membrane was tested for specific conductivity and current efficiency under the same conditions as in Example 1. The values thus obtained were $7.0 \times 10^{-3}$ mho/cm and 65% respectively.

EXAMPLE 3

Terpolymerization was conducted utilizing the monomers of Example 1 plus perfluoropropyl vinyl ether following the procedure of Example 1. When the membrane obtained was subjected to the same procedure as that of Example 1, it manifested a current efficiency as high as the membrane of Example 1.

EXAMPLE 4

Terpolymerization was carried out using the monomers of Example 1 plus perfluoro-3,6-dioxa-5-methyl nonene-1, $CF_3CF_2CF_2OCF(CF_3)CF_2OCF=CF_2$. When the membrane obtained was subjected to the same procedure as in Example 1, there were obtained similar results.

EXAMPLE 5

A sulfonyl fluoride form membrane having an exchange capacity of 0.65 milligram equivalent/gram of dry resin was obtained by a procedure similar to that of Example 1. The membrane was placed in a flask and tetrahydrofuran was added. Lithium boron hydride was added in a large excess, and the resultant reaction system heated under reflux for 50 hours. At the end of the reaction, the membrane was subjected to measurement of A.T.R. In the spectrum, the absorption band at 1470 cm$^{-1}$ characteristic of sulfonyl fluoride substantially vanished and a large absorption band at 1690 cm$^{-1}$ characteristic of —COOLi and small absorption bands at 940 cm$^{-1}$ and 1010 cm$^{-1}$ characteristic of sulfinic acid salt appeared instead. This membrane was allowed to stand in an aqueous 0.1 percent Crystal Violet solution (containing 10 percent ethanol) for three minutes and, thereafter, the cross section of the membrane was observed under a microscope. The microscopic observation revealed a strongly stained layer having a thickness of about 10 microns on each surface of the membrane.

The carboxylic acid group content in the surface layers, as determined from A.T.R. was about 60 percent.

EXAMPLE 6

Terpolymerization was carried out using the monomers of Example 1 plus hexafluoropropylene following the procedure of Example 1. When the membrane obtained was subjected to procedures similar to those of Example 1, similar results were obtained.

EXAMPLE 7

The sulfonyl chloride form of the membrane obtained in Example 1 was reduced in an aqueous 35 percent hypophosphorus acid solution at 80° C. for ten hours. By A.T.R., the absorption band at 1420 cm$^{-1}$ characteristic of the sulfonyl chloride group vanished, but the absorption band at 1780 cm$^{-1}$ characteristic of the carboxylic acid group was not very strong. When the membrane was washed with water and treated in 47% hydrobromic acid at 80° C. for 20 hours, the absorption band at 1780 cm$^{-1}$ characteristic of the carboxylic acid group increased in intensity. The cation exchange groups on the surface were measured by A.T.R. to be 90%.

When the membrane was saponified in an aqueous solution of 2.5 N caustic soda/50 percent methanol and then subjected to measurement of A.T.R. the absorption by the carboxylic acid group at 1780 cm$^{-1}$ was noted to have been shifted to an absorption band at 1690 cm$^{-1}$ characteristic of carboxylic acid salt. Low intensity absorption due to the sulfinic acid salt group appeared at 940 and 1010 cm$^{-1}$. The specific conductivity and current efficiency of the membrane, when measured under the conditions of Example 1, were found to be $9.5 \times 10^{-3}$ mho/cm and 92 percent respectively.

EXAMPLE 8

The sulfonyl chloride form of the membrane obtained (by the method of Example 1) was refluxed in an aqueous solution of tin and hydrochloric acid for 50 hours and then subjected to measurement of A.T.R. In the spectrum, the absorption band at 1420 cm$^{-1}$ characteristic of the sulfonyl chloride group vanished and a sharp absorption band at 1780 cm$^{-1}$ characteristic of the carboxylic acid group appeared. The carboxylic acid groups were present on the surface (100%) by measurement of A.T.R. This membrane was saponified in an aqueous solution of 2.5 N caustic soda/50 percent methanol. The specific conductivity and current efficiency of the saponified membrane, when measured under conditions of Example 1 and maintaining the alkali concentration in the cathode compartment at 20%, were found to be $2.0 \times 10^{-3}$ mho/cm and 96 percent respectively.

EXAMPLE 9

Example 8 was repeated, except that an aqueous solution of stannous chloride and hydrochloric acid was used in place of the aqueous solution of tin and hydrochloric acid, to give a similar result.

EXAMPLE 10

The sulfonyl chloride form of the membrane obtained in Example 1 was submerged in an aqueous 15 percent sodium sulfide solution under a continuous flow of nitrogen gas at 60° C. for one hour. At the end of the reaction, the membrane was subjected to measurement of A.T.R. In the spectrum, the absorption band at 1420 cm$^{-1}$ characteristic of the sulfonyl chloride group completely vanished and sharp absorption bands at 940 cm$^{-1}$ and 1010 cm$^{-1}$ characteristic of a sulfinic acid salt appeared. The membrane was converted into the H form by immersion in 1 N hydrochloric acid solution at 60° C. for 10 hours, and heated under nitrogen gas at 150° C. for 120 minutes. It was then converted into the Na form by immersion in a 2.5 N caustic soda solution and subjected to measurement of A.T.R. In the spectrum, the absorption bands at 940 cm$^{-1}$ and 1010 cm$^{-1}$ characteristic of the sulfinic acid salt completely disappeared and a strong absorption band at 1690 cm$^{-1}$ characteristic of carboxylic acid salt appeared. The cation exchange groups on the surface were found by A.T.R. to be carboxylic acid groups (100%). The membrane was immersed in an aqueous solution of 2.5 N caustic soda/50 percent methanol to effect saponification of those sulfonyl chloride groups still remaining in the membrane interior. The specific conductivity and current efficiency of the saponified membrane, when measured under the same conditions as in Example 1, were found to be $9.2 \times 10^{-3}$ mho/cm and 95 percent respectively. When the current efficiency was measured under the same conditions as those of Example 1, except that the alkali concentration in the cathode compartment fixed at 40 percent, there was obtained a value of 97 percent.

COMPARISON EXAMPLE 3

The sulfonyl chloride form of the membrane obtained in Example 1 was saponified in an aqueous solution of 2.5 N caustic soda/50 percent methanol. The current efficiency of the saponified membrane, when measured under the same conditions in Example 1, except that the alkali concentration in the cathode compartment fixed at 40 percent, was 52 percent.

EXAMPLE 11

The procedure of Example 10 was repeated, except an aqueous 5 percent potassium iodide solution was used in place of the aqueous 15 percent sodium sulfide solution. The results were similar to those obtained in Example 10.

EXAMPLE 12

Two sheets of the sulfonyl chloride form of the membrane obtained in Example 1 were incorporated in frames similar to those used in Example 1. The frames were immersed in triethanol amine so that one surface of each membrane would undergo a reaction at 80° C. for 20 hours. The treated surfaces of each membrane were subjected to measurement of A.T.R. In the spectrum, the absorption band at 1420 cm$^{-1}$ characteristic of the sulfonyl chloride group vanished and strong absorption bands at 940 cm$^{-1}$ and 1010 cm$^{-1}$ characteristic of the sulfinic acid salt appeared. The membrane was saponified in an aqueous solution of 2.5 N caustic soda/50 percent methanol, then heated in 12 N hydrochloric acid at 90° C. for 30 hours, again converted into the Na form by means of 2.5 N caustic soda and subjected to measurement of A.T.R. A sharp absorption band characteristic of a carboxylic acid salt appeared at 1690 cm$^{-1}$. The absorption bands at 940 cm$^{-1}$ and 1010 cm$^{-1}$ practically disappeared. The percentage of carboxylic acid groups present on the surface as cation exchange groups was 85% by measurement of A.T.R.

The specific conductivity of this membrane, when measured under the same conditions as in Example 1, was found to be $11.0 \times 10^{-3}$ mho/cm. The current efficiency of the membrane, when measured with the treated surface facing the cathode compartment side, was 89 percent.

EXAMPLE 13

The sulfonyl chloride form of the membrane obtained in Example 1 was allowed to react in 5 percent hexane-tetrahydrofuran solution of butyl lithium at 60° C. for eight hours and then subjected to measurement of A.T.R. In the spectrum, the absorption band of the sulfonyl chloride group at 1420 cm$^{-1}$ dwindled by about 60 percent and absorption bands at 940 and 1010 cm$^{-1}$ characteristic of the sulfinic acid salt appeared.

EXAMPLE 14

The sulfonyl chloride form of the membrane obtained in Example 1 was saponified, converted into the H form with hydrochloric acid, thoroughly dried, and reacted in a tetrahydrofuran solution of lithium aluminum hydride at 40° C. for 20 hours. In A.T.R., an absorption band at 1780 cm$^{-1}$ characteristic of the carboxylic acid group was slightly visible.

EXAMPLE 15

A sulfonyl fluoride form membrane 0.20 mm in thickness was prepared by a procedure similar to that of Example 1. One surface of the membrane was saponified with an aqueous solution of 2.5 N caustic soda/50 percent methanol. The membrane was spread out with the nonsaponified surface held downwardly on a plain-weave fabric of polytetrafluoroethylene 0.15 mm in thickness with warp and filling yarns, both of 400-denier multifilaments, repeated each at a rate of 40 yarns per inch. The membrane and fabric were heated to 270° C. with the membrane simultaneously drawn against the fabric by means of a vacuum so as to embed the fabric in the membrane as a reinforcing material.

This membrane was converted to the sulfonyl chloride form by the same method as used in Example 1. With frames made of acrylic resin, two such membranes were held fast against each other with the fabric-reinforced surface on the inside. The frames containing the two adjoining membranes were immersed in an aqueous 17 percent hydrobromic acid solution and caused to undergo a reaction at 80° C. for 20 hours. After the reaction, the membranes were removed, saponified in an aqueous solution of 2.5 N caustic soda/50 percent methanol and further oxidized in a solution of 2.5 N caustic soda/2.5 percent sodium hypochlorite at 90° C.

for 16 hours. The specific conductivity and current efficiency of the membrane, when measured under the conditions of Example 1 with the treated surface held in the direction of the cathode, were found to be $5.0 \times 10^{-3}$ mho/cm and 95 percent respectively.

COMPARISON EXAMPLE 4

The reinforced membrane obtained in Example 15 was saponified. The specific conductivity and current efficiency of the saponified membrane, when measured under the same conditions as in Example 1, were found to be $6.0 \times 10^{-3}$ mho/cm and 58 percent respectively.

EXAMPLE 16

The treated membrane obtained in Example 1 after oxidation with a mixture of 2.5 normal sodium hydroxide and 2.5% sodium hypochlorite was subjected to separated durability tests by immersion in 45% caustic soda or in 5% sodium hypochlorite at 90° C. for 300 hours. Thereafter, the treated surface of the membrane was subjected to measurement of A.T.R. In the spectrum, an absorption band at 1690 cm$^{-1}$ characteristic of the carboxylic acid group was observed. When the membrane was converted into the H form in 1 N hydrochloric acid, the absorption band shifted to 1780 cm$^{-1}$, indicating that the membrane had undergone substantially no change during the durability test. The specific conductivity and current efficiency of the membrane, when measured after the durability test under the same conditions as in Example 1, were found to be $9.9 \times 10^{-3}$ mho/cm and 94 percent in the case of the sample which had been subjected to the durability test in the 45% caustic soda and $10.2 \times 10^{-3}$ mho/cm and 96 percent with the sample tested in 5% sodium hypochlorite. The results indicate that the membrane had undergone absolutely no change during the durability tests.

EXAMPLE 17

The sulfonyl chloride form of the membrane obtained in Example 1 was saponified, then converted into the H form with 1 N hydrochloric acid, thoroughly dried and treated with phosphorus pentoxide suspended in phosphorus oxychloride at 110° C. for 24 hours. After this treatment by A.T.R. measurement, absorption bands at 1460 and 1470 cm$^{-1}$ characteristic of sulfonic anhydride were observed. The membrane was allowed to react with lithium aluminum hydride under the same conditions as in Example 14, whereby a similar result was obtained.

EXAMPLE 18

The procedure of Example 2 were repeated except that the steps of saponification and oxidation were reversed. The results were similar to those obtained in Example 2.

EXAMPLE 19

The procedure of Example 1 was repeated, except the reaction in the hydroiodic acid solution was carried out at 40° C. for four hours and, after saponification, the reaction in hydroiodic acid solution was repeated at 80° C. for 25 hours. The resultant membrane was oxidized in an aqueous solution of 2.5 N caustic soda/2.5 percent sodium hypochlorite and then measured for specific conductivity and current efficiency under the same conditions as in Example 1. The values obtained were $11.0 \times 10^{-3}$ mho/cm and 94 percent respectively.

EXAMPLE 20

Polytetrafluoroethylene powder and glass fibers were blended. The blend was compression molded under a pressure of 300 kg/cm$^2$ to produce a polytetrafluoroethylene sheet with a thickness of 1 millimeter. The sheet was heated in an electric furnace at 320° C. for one hour to fuse the polytetrafluoroethylene powder, and thereafter treated with hydrofluoric acid to dissolve the glass phase. Consequently, there was obtained a neutral membrane with a porous structure.

This neutral membrane was coated three times with a 1,1,2-trichloro-1,2,2-trifluoroethane solution of a copolymer of tetrafluroethylene and perfluoro(3,6-dioxa-4-methyl-7-octenesulfonyl fluoride) having an exchange capacity of 1.2 milligram equivalents/gram of dried resin, and obtained by a polymerization procedure similar to that of Example 1. The solvent was evaporated from the coated membrane. Thereafter, the coat was pressed on the membrane at 270° C. for 10 minutes, to produce a laminate with a thickness of 50μ.

Under the same conditions as those of Example 1, this membrane was converted into the sulfonyl chloride form, and reacted with hydrogen iodide gas at 100° C. for 40 hours. The A.T.R. indicated complete disappearance of the absorption band at 1420 cm$^{-1}$ characteristic of the sulfonyl chloride group, and showed sharp absorption at 1780 cm$^{-1}$ characteristic of the carboxylic acid group.

EXAMPLE 21

In 1,1,2-trichloro-1,2,2-trichloroethane, tetrafluoroethylene and perfluoro-3,6-dioxa-4-methyl-7-octene sulfonyl fluoride were copolymerized in the presence of perfluoropropionyl peroxide as the polymerization initiator, with the polymerization temperature fixed at 45° C. and the pressure maintained at 5 kg/cm$^2$G. during the polymerization. The polymer obtained is identified as Polymer 1.

The copolymerization was repeated by the same procedure, except the pressure was maintained at 3 kg/cm$^2$ throughout the polymerization to produce Polymer 2.

A portion of each of the polymers thus produced was subjected to hydrolysis in a mixture of aqueous 5 N caustic soda solution and methanol (volume ratio of 1:1) at 90° C. for 16 hours to be converted into the sodium sulfonate form. The exchange capacity of the sodium sulfonate form polymer was found to be 0.74 milliequivalent/g of dry resin in the case of Polymer 1 and 0.91 milliequivalent/g of dry resin in the case of Polymer 2.

Polymer 1 and Polymer 2 were heat molded to produce separate membranes 2 mils and 4 mils in thickness. The two membranes were joined face to face and molded under heating into a composite membrane. The composite membrane was treated in the aforementioned hydrolyzing system to be converted into a sodium sulfonate form composite membrane.

The composite membrane was converted into the H form by treatment in an aqueous 1 N hydrochloric acid solution and subsequently converted into the sulfonyl chloride form by reaction with a mixture of phosphorus pentachloride and phosphorus oxychloride (gravimetric ratio 1:1) at 120° C. for 40 hours. At the end of the reaction, the composite membrane was washed for four hours under reflux in carbon tetrachloride and dried under vacuum at 40° C.

The dried membrane was subjected to measurement of A.T.R. to reveal that in both the membranes of Polymer 1 and Polymer 2, the absorption band of sulfonyl chloride appeared at 1420 cm$^{-1}$ and absorption due to the sulfonic acid group at 1060 cm$^{-1}$ completely disappeared.

Two sheets of the composite membrane were held against each other with the Polymer 2 membrane sides facing inwardly and, in that state, set in position in frames made of acrylic resin and fastened up by use of packings made of polytetrafluoroethylene. The frames were immersed in an aqueous 57 percent hydroiodic acid solution so that only the exposed surfaces (Polymer 1 membrane side) would undergo reaction at 80° C. for 30 hours. The membranes were washed with water at 60° C. for 30 minutes. The infrared spectrum of each treated surface was measured. In the spectrum, the absorption band at 1420 cm$^{-1}$ characteristic of sulfonyl chloride completely vanished, and an absorption band at 1780 cm$^{-1}$ characteristic of a carboxylic acid group appeared. In Crystal Violet solution, a stained layer of a width of about 0.3 mil was observed on the Polymer 1 side of the membrane. The cation exchange groups on the surface were found to be carboxylic acid groups (100%) by A.T.R.

The membrane was saponified in an aqueous solution of 2.5 N caustic soda/50 percent methanol at 60° C. for 16 hours and then subjected to measurement of A.T.R. In the spectrum, the absorption band of the carboxylic acid group was shifted to 1690 cm$^{-1}$ in the Polymer 1 side of the membrane. On the Polymer 2 side of the membrane, an absorption band at 1055 cm$^{-1}$ characteristic of sodium sulfonate appeared. The membrane was immersed in an aqueous 2.5 percent sodium hypochlorite solution and oxidized at 90° C. for 16 hours.

The specific conductivity of the resultant membrane, when measured in an aqueous 0.1 N caustic soda solution, was found to be 5.2×10$^{-3}$ mho/cm.

The specific conductivity of the membrane was determined after complete conversion into the Na form, keeping the membrane in a constantly renewed bath of an aqueous 0.1 N caustic soda solution at normal room temperature for ten hours until equilibrium and subjecting it to an alternating current of 1000 cycles while under an aqueous 0.1 N soda solution at 25° C. for measurement of the electric resistance of the membrane.

The Na form cation exchange membrane was equilibrated by immersion in an aqueous 2 N caustic soda solution at 90° C. for 16 hours, then incorporated in an electrolytic cell with the reacted surface, namely the Polymer 1 side, facing the cathode. It was tested for current efficiency as the membrane in the electrolysis of sodium chloride. The value thus found was 94 percent.

The service area of the electrolytic cell was 15 cm$^2$ (5 cm ×3 cm). It comprised an anode compartment and a cathode compartment separated by the electrolytic membrane. A metallic anode coated with a noble metal was used as the anode and an iron plate as the cathode. An aqueous 3 N sodium chloride solution at pH 3 was circulated through the anode compartment and an aqueous 30 percent caustic soda solution was circulated through the cathode compartment at 90° C. Under these conditions, an electric current was passed between the electrodes at a current density of 50 amperes/dm$^2$. The current efficiency was calculated by dividing the amount of caustic soda produced in the cathode compartment per hour by the theoretical value calculated from the amount of electricity passed.

The passage of the electric current was continued for 2000 hours. Thereafter, the current efficiency was measured and found to be 93.8 percent.

COMPARISON EXAMPLE 5

The sulfonyl chloride form of the composite membrane obtained in Example 21 was saponified in a solution of 2.5 N caustic soda/50 percent methanol. The specific conductivity and current efficiency of the saponified membrane, when measured under the conditions of Example 21, were found to be 7.5×10$^{-3}$ mho/cm and 70 percent.

EXAMPLE 22

The procedure of Example 21 was repeated, except that the steps of saponification and oxidation were reversed. The specific conductivity and current efficiency of the membrane were similar to those obtained in Example 21.

EXAMPLE 23

The procedure of Example 21 was repeated, except that the membrane was allowed to react in an aqueous 20 percent potassium iodide solution at 60° C. for 30 hours in place of the treatment in hydrogen iodide. At the end of the reaction, the treated surface was subjected to measurement of A.T.R. In the spectrum, absorption bands due to potassium sulfinate were observed at 1010 cm$^{-1}$ and 940 cm$^{-1}$. In Crystal Violet solution, a surface layer of a thickness of 0.2 mil on the Polymer 1 side was observed to be stained.

The membrane was saponified under the same conditions as those of Example 21 and then allowed to react in 57 percent hydroiodic acid at 80° C. for 30 hours. At the end of the reaction, the Polymer 1 side of the membrane was subjected to measurement of A.T.R. In the spectrum, the absorption by potassium sulfinate completely disappeared and an absorption by carboxylic acid appeared at 1780 cm$^{-1}$. The cation exchange groups on the surface were found to be carboxylic acid groups (about 100%) by A.T.R. On the Polymer 2 side of the membrane, an absorption by sulfonic acid appeared at 1060 cm$^{-1}$. The membrane was further oxidized under the same conditions as those of Example 21. The specific conductivity and current efficiency of the membrane were found to be 5.3×10$^{-3}$ mho/cm and 94 percent respectively.

EXAMPLE 24

A copolymer (Polymer 3) was prepared by repeating the procedure of Example 21, except that the pressure was maintained at 7 kg/cm$^2$G during the polymerization.

The exchange capacity of Polymer 3, when measured by the same procedure as that of Example 21, was found to be 0.68 milliequivalent/g of dry resin.

By following the procedure of Example 21, a composite membrane comprising a Polymer 2 membrane, 4 mils in thickness, and a Polymer 3 membrane, 2 mils in thickness, was produced.

The composite membrane was subjected to hydrolysis in a mixture of an aqueous 5 N caustic soda solution and methanol (volume ratio of 1:1) at 60° C. for 40 hours, converted into the H form by treatment in an aqueous 1 N hydrochloric acid solution and thereafter converted again into the ammonium sulfonate form by treatment in an aqueous 1 N ammonia solution.

It was then allowed to react in a mixture of phosphorus pentachloride and phosphorus oxychloride (gravimetric ratio 1:1) at 120° C. for 36 hours to be converted into the sulfonyl chloride form.

The composite membrane was incorporated in a flow-gas reaction system and so that the Polymer 3 side of the composite membrane was allowed to undergo a contact reaction with 20.0 percent hydrogen iodide gas (with nitrogen as the diluting gas) at 100° C. for 12 hours. The treated surface of the membrane was subjected to measurement of A.T.R. In the spectrum, an absorption band due to carboxylic acid appeared at 1780 cm$^{-1}$ and the absorption band due to sulfonyl chloride at 1420 cm$^{-1}$ disappeared. In Crystal Violet solution, a layer of 0.4 mil in thickness was stained. By A.T.R. measurement, about 100% of the cation exchange groups were found to be carboxylic acid groups.

The composite membrane was then hydrolyzed, oxidized, and incorporated in an electrolytic cell with the Polymer 3 side facing the cathode compartment. In this electrolytic system, electrolysis of sodium chloride was carried out under the same conditions as in Example 21, with the concentration of caustic soda circulated to the cathode compartment fixed at 20 percent. The current efficiency was 97 percent, and the specific conductivity was $4.3 \times 10^{-3}$ mho/cm.

The current efficiency, when measured after 1700 hours of continued passage of electric current, was 97.2 percent.

COMPARISON EXAMPLE 6

The sulfonyl chloride form of the composite membrane obtained in Example 24 was hydrolyzed in a solution of 2.5 N caustic soda/50 percent methanol. The specific conductivity of the resultant membrane was $5.2 \times 10^{-3}$ mho/cm. The membrane was subjected to electrolysis under the same conditions as those of Example 24, with the Polymer 3 side facing the cathode compartment. The current efficiency was 80.2 percent.

EXAMPLE 25

Two sheets of the sulfonyl chloride form of the membrane obtained in Example 24 were held against each other with the Polymer 2 sides facing inwardly and, in that state, set in frames of acrylic resin, immersed in an aqueous 20 percent sodium sulfide solution and allowed to react under a continuous flow of nitrogen gas at 70° C. for two hours. At the end of the reaction, the treated surface of the membrane was subjected to measurement of A.T.R. In the spectrum, the absorption band at 1420 cm$^{-1}$ characteristic of the sulfonyl chloride group disappeared, and absorption bands at 1010 cm$^{-1}$ and 940 cm$^{-1}$ characteristic of sulfinic acid salts were observed.

The membrane was immersed in an aqueous 2.5 percent sodium hypochlorite solution at 70° C. for 16 hours and was again subjected to measurement of A.T.R. In the spectrum, the absorption bands at 1010 cm$^{-1}$ and 940 cm$^{-1}$ vanished and an absorption band at 1055 cm$^{-1}$ characteristic of sodium sulfonate appeared.

Two sheets of the membrane treated with sodium sulfide as described above were washed with water and set again in the frames so that the Polymer 3 side reacted in a solution of 47 percent hydrogen bromide at 80° C. for 20 hours. In A.T.R. obtained from the membrane, a sharp absorption band due to the carboxylic acid group appeared at 1780 cm$^{-1}$.

The membrane was saponified in an aqueous solution of 2.5 N caustic soda/50 percent methanol and subjected again to measurement of A.T.R. In the spectrum, the absorption band at 1780 cm$^{-1}$ vanished, an absorption band due to sodium carboxylate appeared at 1690 cm$^{-1}$, and minor absorption bands due to sulfinic acid salts appeared at 940 cm$^{-1}$ and 1010 cm$^{-1}$. By A.T.R. measurement, about 90% of the cation exchange groups on the surface were found to be carboxylic acid groups.

The membrane was then treated in an aqueous 2.5 percent sodium hypochlorite solution at 90° C. for 16 hours. The specific conductivity of the treated membrane was found to be $4.6 \times 10^{-3}$ mho/cm. The current efficiency, when measured under the same electrolytic conditions as those of Example 24, was found to be 92 percent. Substantially the same current efficiency was shown after 1700 hours of continued passage of electric current.

EXAMPLE 26

The membrane treated with sodium sulfide in Example 25 was saponified in an aqueous 2.5 N caustic soda/50 percent methanol at 60° C. for 16 hours. The membrane was then treated in an aqueous 1 N hydrochloric acid solution at 60° C. for 16 hours and thereafter heated in the air at 150° C. for one hour. The Polymer 3 side of the membrane was subjected to measurement of A.T.R. spectrum. In the spectrum, an absorption band due to the carboxylic acid group appeared at 1780 cm$^{-1}$. When this membrane was converted to the salt form, an absorption band due to carboxylate appeared strongly at 1690 cm$^{-1}$, and weak absorption bands by sulfinic acid salts appeared at 1010 cm$^{-1}$ and 940 cm$^{-1}$. The cation exchange groups on the surface were found to be carboxylic acid groups (about 90%) by A.T.R. The membrane was oxidized in an aqueous 2.5 percent sodium hypochlorite solution at 90° C. for 16 hours. The specific conductivity of the oxidized membrane was found to be $4.4 \times 10^{-3}$ mho/cm. The current efficiency of the membrane, when measured under the same conditions as those of Example 24, was found to be 93 percent.

EXAMPLE 27

Tetrafluoroethylene and perfluoro-3,6-dioxa-4-methyl-7-octene sulfonyl fluoride were emulsion polymerized at 70° C. under 4.5 atmospheres of tetrafluoroethylene pressure, with ammonium persulfate used as the initiator and the ammonium salt of perfluoro-octanoic acid as the emulsifier.

The polymer consequently obtained was washed with water, then hydrolyzed and thereafter subjected to measurement of exchange capacity by a titrimetric method. The exchange capacity was found to be 0.80 milligram equivalent/gram dry resin. This polymer is identified as Polymer 4.

By a procedure similar to that of Example 21, Polymer 2 used in Example 21 and Polymer 4 were combined to produce a composite membrane comprising a Polymer 2 membrane which had a thickness of 4 mils, and a Polymer 4 membrane which had a thickness of 3 mils. This composite membrane was spread out with the Polymer 2 side held downwardly on a woven fabric of polytetrafluoroethylene about 0.15 mm in thickness having filling yarns of 400-denier multifilaments and warp yarns of 200-denier multifilaments ×2 repeated each at a rate of 25 yarns per inch. The membrane and fabric were heated to 270° C. with the membrane simultaneously drawn against the membrane by means of a vacuum so as to embed the fabric in the membrane as a reinforcing material.

This membrane was converted into the sulfonyl chloride form by the same procedure as used in Example 21. Two sheets of the membrane were held against each other with the Polymer 2 sides (the sides having the fabric embedded) facing inwardly by means of frames made of acrylic resin. The Polymer 4 sides of the membrane were allowed to react with hydrogen sulfide gas introduced in a continuous flow at 120° C. for 20 hours.

The membrane was removed, saponified in an aqueous solution of 2.5 N caustic soda/50 percent methanol and thereafter oxidized in a solution of 2.5 N caustic soda/2.5 percent sodium hypochlorite at 90° C. for 16 hours. The specific conductivity, when measured by the same method as used in Example 21, was found to be $3.2 \times 10^{-3}$ mho/cm. The current efficiency was 94 percent. Even after 1000 hours of continued passage of electric current, the current efficiency remained unchanged.

COMPARISON EXAMPLE 7

The reinforced composite membrane obtained in Example 26 was saponified. The specific conductivity and current efficiency of the resultant membrane, when measured under the same conditions as those of Example 21, were found to be $3.9 \times 10^{-3}$ mho/cm and 62.1 percent respectively.

EXAMPLE 28

The fluorocarbon cation exchange membrane, "Nafion #315," made by E. I. DuPont de Nemours & Company was treated by immersion in an aqueous 1 N hydrochloric acid solution at 60° C. for 16 hours and then converted into the ammonium sulfonate form with an aqueous 1 N ammonia solution. The membrane was dried under vacuum at 50° C. for 16 hours and then allowed to react in a mixture of phosphorus pentachloride and phosphorus oxychloride (gravimetric ratio 1:1) at 120° C. for 40 hours. The surfaces, having respective equivalent weights of 1500 and 1100, were subjected to measurement of A.T.R. In both of the spectra, the absorption band at 1060 cm$^{-1}$ characteristic of the sulfonic acid group disappeared and an absorption band at 1420 cm$^{-1}$ characteristic of sulfonyl chloride was observed. Two sheets of the membrane were held against each other with the sides having the equivalent weight 1100 facing inwardly, inserted in frames made of acrylic resin, immersed in an aqueous 57 percent hydroiodic acid solution and allowed to react at 80° C. for 24 hours. At the end of the reaction, the membrane was washed with water and the side of the membrane having the equivalent weight 1500 was subjected to measurement of A.T.R. In the spectrum, the absorption band at 1420 cm$^{-1}$ characteristic of sulfonyl chloride disappeared and an absorption band at 1780 cm$^{-1}$ characteristic of the carboxylic acid group appeared. In the case of the A.T.R. obtained with the side of the membrane having the equivalent weight of 1100, the absorption at 1420 cm$^{-1}$ characteristic of sulfonyl chloride remained intact. This membrane was saponified in a solution of 2 N caustic soda/50 percent methanol at 60° C. for 40 hours. Then, it was oxidized in an aqueous 2.5 percent sodium hypochlorite solution at 90° C. for 16 hours. Thereafter, the membrane was placed in an electrolytic cell with the side having the equivalent weight 1500 facing the cathode and electrolysis of sodium chloride was carried out under the same conditions as those of Example 24.

The current efficiency was 96 percent. The specific conductivity was $2.0 \times 10^{-3}$ mho/cm.

The current efficiency of the membrane, when measured after 1500 hours of continued passage of the same electric current, was found to be essentially unchanged.

COMPARISON EXAMPLE 8

The sulfonyl fluoride form membrane as prepared in Example 1 was fastened in position between frames made of acrylic resin. Only the one surface was allowed to react with a mixture of ammonia gas with air (about one vol. %) at room temperature for 15 hours. After the reaction, the cross section of the membrane was stained with Methyl Red, whereby the stained layer caused by sulfonamide groups appeared to the depth of 0.02 mm only at the reacted surface. This membrane was subjected to saponification and equilibration under the same conditions as in Example 1, followed by measurement of specific conductivity to give the result of $9.8 \times 10^{-3}$ mho/cm.

Current efficiency was measured under the same conditions as in Example 1, with the surface having the sulfonamide groups facing the cathode side, to be 87%. Furthermore, after continuous passage of current for 1000 hours, the current efficiency measured was as low as 80%.

COMPARISON EXAMPLE 9

The sulfonyl fluoride form membrane as prepared in Example 1 was treated at only one surface with ethylene diamine at room temperature for 20 hours. After the reaction, the membrane was washed with diglyme, followed by washing with benzene, and finally washed with water warmed at about 40° C. When the cross section of this membrane was stained with Methyl Red, only the treated surface was stained to the depth of 0.01 mm to find out that N-substituted sulfonamide was formed. This membrane was subjected to saponification and equilibration under the same conditions as in Example 1. The specific conductivity was measured to be $10.2 \times 10^{-3}$ mho/cm.

Current efficiency was measured, with the surface having the N-substituted sulfonamide groups facing the cathode side, under the same conditions as in Example 1 to be 91%. After continuous current passage prolonged for 1000 hours, the current efficiency was found to be lowered to 74%.

COMPARISON EXAMPLE 10

The cation exchange membrane as prepared in Comparison Example 9 was subjected to oxidative treatment with 2.5% aqueous sodium hypochlorite solution at 90° C. for 16 hours. With the surface having the N-substituted sulfonamide groups facing the cathode side, current efficiency was measured under the same conditions as in Example 1 to be 76%. Formation of sulfonic acid groups was confirmed by measurement of A.T.R. after the oxidative treatment.

What we claim is:

1. A cation exchange membrane comprising a fluorocarbon polymer containing a plurality of pendant carboxylic acid or salt groups of the formula —OCF$_2$COOM wherein M is selected from the group consisting of hydrogen; ammonium; quaternary ammonium; and metallic atoms.

2. A cation exchange membrane as in claim 1, wherein the fluorocarbon polymer further contains pendant sulfonic acid or salt groups represented by the formula:

—OCF$_2$CF$_2$SO$_3$M.

3. A cation exchange membrane as in claim 1, comprising (a) at least one stratum at least 100 A in thickness of a fluorocarbon polymer containing a plurality of pendant carboxylic acid or salt groups of the formula —OCF$_2$COOM and (b) a fluorocarbon polymer having cation exchange groups substantially consisting of sulfonic acid or salt groups of the formula —OCF$_2$CF$_2$SO$_3$M.

4. A cation exchange membrane as in claim 3, wherein the fluorocarbon polymer of stratum (a) further contains pendant sulfonic acid or salt groups of the formula —OCF$_2$CF$_2$SO$_3$M.

5. A cation exchange membrane as in claim 3, wherein the fluorocarbon polymer (a) is a surface stratum on one surface of the membrane.

6. A cation exchange membrane as in claim 1, substantially consisting of the fluorocarbon polymer containing a plurality of pendant carboxylic acid or salt groups of the formula —OCF$_2$COOM.

7. A cation exchange membrane as in claim 1, wherein at least 20 mol percent of the ion exchange groups contained as pendant groups of the fluorocarbon polymer are —OCF$_2$COOM.

8. The cation exchange membrane of claim 1 reinforced with a material selected from the group consisting of woven fabrics of inert fibers.

9. The cation exchange membrane of claim 8 wherein the inert fibers are polytetrafluoroethylene.

10. A cation exchange membrane comprising two bonded polymer films, a first film comprising a fluorocarbon polymer containing a plurality of pendant carboxylic acid or salt groups represented by the formula:

—OCF$_2$COOM wherein M is selected from the group consisting of hydrogen; ammonium; quaternary ammonium; and metallic atoms; and a second film comprising a fluorocarbon polymer containing pendant sulfonic acid or salt groups represented by the formula:

—OCF$_2$CF$_2$SO$_3$M wherein M is selected from the group consisting of hydrogen; ammonium; quaternary ammonium; and metallic atoms; the equivalent weight of the polymer in each film being from 1000 to 2000; the equivalent weight of the polymer in the first film being at least 150 higher than the polymer in the second film; the thickness of the first film being up to 50% of the total thickness.

11. A cation exchange membrane as in claim 10, wherein the fluorocarbon polymer in the first film further contains pendant sulfonic acid or salt groups represented by the formula:

—OCF$_2$CF$_2$SO$_3$M.

12. A cation exchange membrane as in claim 10, wherein the first film comprises (a) a fluorocarbon polymer containing a plurality of pendant carboxylic acid or salt groups of the formula —OCF$_2$COOM and (b) a fluorocarbon polymer having cation exchange groups substantially consisting of sulfonic acid or salt groups of the formula —OCF$_2$CF$_2$SO$_3$M, said fluorocarbon polymer (a) existing as at least one layer in a thickness of each of at least 100 A on the surface or in the internal portion of the first film.

13. A cation exchange membrane as in claim 12, wherein the fluorocarbon polymer (a) further contains pendant sulfonic acid or salt groups of the formula —OCF$_2$CF$_2$SO$_3$M.

14. A cation exchange membrane as in claim 12, wherein the fluorocarbon polymer (a) is present as a surface stratum at least about 100 A in thickness on one surface of the membrane.

15. A cation exchange membrane as in claim 10, wherein the first film substantially consists of the fluorocarbon polymer containing a plurality of pendant carboxylic acid or salt groups of the formula —OCF$_2$COOM.

16. A cation exchange membrane as in claim 10, wherein at least 20 mol percent of the ion exchange groups contained as pendant groups of the fluorocarbon polymer in the first film are —OCF$_2$COOM.

17. The cation exchange membrane of claim 10, reinforced with a material selected from the group consisting of woven fabrics of inert fibers.

18. The cation exchange membrane of claim 17, wherein the inert fibers are polytetrafluoroethylene.

19. The cation exchange membrane of claim 17, wherein the reinforcing material is embedded in the second film.

20. A method for the production of a cation exchange membrane comprising a fluorocarbon polymer containing a plurality of pendant carboxylic acid or salt groups represented by the formula:

—OCF$_2$COOM wherein M is selected from the group consisting of hydrogen; ammonium; quaternary ammonium; and metallic atoms, which method comprises treating with a reducing agent a membrane comprising a corresponding fluorocarbon polymer characterized by the presence of sulfonyl groups represented by the formula:

$$—OCF_2CF_2SO_2X$$
and/or
$$\begin{matrix}—OCF_2CF_2SO_2\searrow\\ \phantom{xxxxxxxxxxx}O\\ —OCF_2CF_2SO_2\nearrow\end{matrix}$$

wherein X is selected from the group consisting of halogen; hydroxyl; alkyl containing up to four carbon atoms; aryl; and OZ wherein Z is selected from the group consisting of metallic atoms, alkyl containing up to four carbon atoms and aryl.

21. A method as in claim 20 wherein X is chlorine.

22. A method as in claim 20 in which the sulfonyl groups are initially converted to sulfinic acid groups or salts thereof.

23. A method as in claim 22 wherein the initially formed membrane is further treated with a reducing agent to convert the sulfinic acid groups or salts thereof to carboxylic acid or salt groups.

24. A method as in claim 22 wherein the initially formed membrane is heated at from 60° C. to 400° C. for from 15 to 120 minutes to convert the sulfinic acid groups or salts thereof to carboxylic acid or salt groups.

25. A method as in claim 20, wherein the reducing agent is at least one selected from the group consisting of:
(1) inorganic acids possessing reducing activity;
(2) mixtures of metals and acids;
(3) low-valency metal compounds; and
(4) salts of inorganic acids possessing reducing activity.

26. A method as in claim 20, wherein the starting membrane comprises two bonded films, each film containing sulfonyl groups represented by the formula:

$$-OCF_2CF_2SO_2X$$
and/or
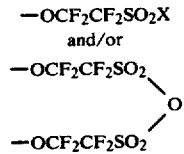

the equivalent weight in each film being from 1000 to 2000; the equivalent weight of the polymer in the first film being at least 150 higher than the polymer in the second film; and the thickness of the first film being up to 50% of the total thickness, said treatment with a reducing agent being applied onto the first film.

27. A method as in claim 20, wherein the starting membrane is reinforced with a material selected from the group consisting of woven fabrics of inert fibers.

28. A method as in claim 27, wherein treatment with a reducing agent is applied onto the side opposite to the reinforced side.

29. A method as in claim 26, wherein the second film in the starting membrane is reinforced with a material selected from the group consisting of woven fabrics of inert fibers.

30. An electrolytic cell comprising an anode portion and a cathode portion separated by a membrane comprising a fluorocarbon polymer containing a plurality of pendant carboxylic acid or salt groups represented by the formula:

$$-OCF_2COOM$$

wherein M is selected from the group consisting of hydrogen; ammonium; quaternary ammonium; and metallic atoms.

31. An electrolytic cell comprising an anode portion and a cathode portion separated by a membrane comprising (a) a surface stratum at least 100 Å in thickness of a fluorocarbon polymer containing a plurality of pendant carboxylic acid or salt groups of the formula $-OCF_2COOM$ and (b) a fluorocarbon polymer having cation exchange groups substantially consisting of sulfonic acid or salt groups of the formula $-OCF_2CF_2SO_3M$, said surface stratum of the membrane facing the cathode side of the cell.

32. An electrolytic cell comprising an anode portion and a cathode portion separated by a membrane comprising two bonded polymer films, a first film comprising a fluorocarbon polymer containing a plurality of pendant carboxylic acid or salt groups represented by the formula:

$$-OCF_2COOM$$

wherein M is selected from the group consisting of hydrogen; ammonium; quaternary ammonium; and metallic atoms; and a second film comprising a fluorocarbon polymer containing pendant sulfonic acid or salt groups represented by the formula:

$$-OCF_2CF_2SO_3M$$

wherein M is selected from the group consisting of hydrogen; ammonium; quaternary ammonium; and metallic atoms; the equivalent weight of the polymer in each film being from 1000 to 2000; the equivalent weight of the polymer in the first film being at least 150 higher than the polymer in the second film; the thickness of the first film being up to 50% of the total thickness, the side of said first film facing the cathode side of the cell.

33. In a method for the electrolysis of an aqueous solution of an alkali metal halide for the production of the corresponding halogen and alkali metal hydroxide, the improvement comprising utilizing the electrolytic cell of claim 30.

34. A method as in claim 33, wherein the alkali metal halide is sodium chloride.

* * * * *